United States Patent [19]

Tomlinson

[11] Patent Number: 4,663,698
[45] Date of Patent: May 5, 1987

[54] APPARATUS FOR DIRECTING A BEAM OF LIGHT

[76] Inventor: Ernest V. Tomlinson, 41 Beechdale Rd., London, S.W.2, Great Britain

[21] Appl. No.: 837,060

[22] Filed: Mar. 6, 1986

[30] Foreign Application Priority Data

Mar. 6, 1985 [GB] United Kingdom ............... 8505754

[51] Int. Cl.⁴ ..................... F21V 21/26; G02B 23/02
[52] U.S. Cl. .................... 362/272; 362/277; 362/301; 362/346; 362/284; 350/543; 350/618
[58] Field of Search ............... 362/268, 35, 271, 272, 362/286, 298, 301, 346, 386, 277, 282, 284, 322, 324; 350/6.91, 6.5, 540, 618, 6.5, 6.9, 541, 543, 567

[56] References Cited

U.S. PATENT DOCUMENTS

| 478,510 | 7/1892 | Hunter | 362/282 |
| 1,607,688 | 11/1926 | Perrin et al. | 350/567 |
| 1,828,924 | 10/1931 | Chardell et al. | 350/618 |
| 2,909,652 | 10/1959 | Pratt | 362/268 |
| 3,609,339 | 9/1971 | Smith | 362/298 |
| 4,260,217 | 4/1981 | Traeger et al. | 350/541 |
| 4,304,535 | 12/1982 | Itoh et al. | 350/543 |

FOREIGN PATENT DOCUMENTS 1180160 10/1964 Fed. Rep. of Germany ...... 350/543

Primary Examiner—William A. Cuchlinski, Jr.
Assistant Examiner—D. M. Cox

[57] ABSTRACT

An optical system directs the output beam of a light source along a first axis fixed relative to a first support carrying the light source. A second support mounted on the first support is rotated by a first motor about the first axis. A first reflector on the second support is oblique to and always intersected by the first axis. A third support mounted on the second support is rotated by a second motor about a second axis coincident with the reflection of the first axis in the first reflector. A second reflector on the third support is oblique to and always intersected by the second axis. By appropriate energization of the motors the light beam can be reflected in any direction.

10 Claims, 1 Drawing Figure

U.S. Patent  May 5, 1987  4,663,698
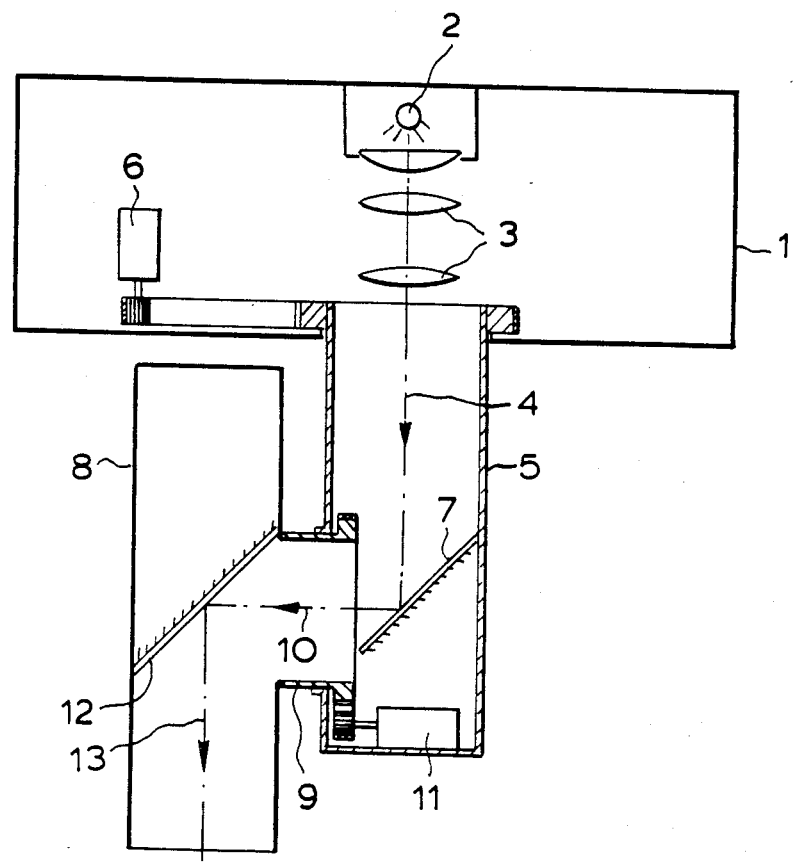

APPARATUS FOR DIRECTING A BEAM OF LIGHT

BACKGROUND TO THE INVENTION

1. Field of Invention

This invention relates to apparatus for directing a beam of light.

2. Description of Prior Art

It is common to provide apparatus for directing a beam of light in, for example, a disco or on a stage and the conventional method of providing such apparatus is to provide a support rotatable about a vertical axis under the control of a motor. The support itself carries a horizontal spindle about which a spotlight or other light source is rotatable under the control of a second motor. By appropriate energisation of the first and second motors, it is possible to direct the beam of the spotlight in any direction. In use, the light source is rotated around the horizontal shaft, which has the effect that the apparatus not being applicable to all light sources, as some will not operate in all orientations. Further a light source with its optical system may be a heavy mass which is difficult to move quickly and quietly.

SUMMARY OF THE INVENTION

It is an object of this invention to provide apparatus for directing a beam in any direction which alleviates the stated problem.

The invention provides apparatus for directing a beam of light in any direction, comprising a first support, a light source mounted on the first support, an optical system arranged to direct the output beam of the light source along a first axis fixed in relation to the first support, a second support mounted on the first support for rotation substantially about the first axis, a first motor for rotating the second support about the first axis, a first reflector mounted on the second support so that the first axis passes through it in all angular positions of the second support about the first axis, the first reflector being oblique to the first axis, a third support mounted on the second support for rotation substantially about a second axis which coincides with the reflection of the first axis in the first reflector, a second motor for rotating the third support about the second axis, and a second reflector mounted on the third support so that the second axis passes through it in all angular positions of the third support about the second axis, the second reflector being oblique to the second axis.

With the apparatus in accordance with the invention, by appropriate energisation of the first and second motors, the beam can be reflected by the first and second reflectors in any direction but at all times the light source has its output beam directed along the first axis, which is fixed. This is desirably vertical, in which orientation a conventional light source can be used as the light source.

In a preferred embodiment the first mirror is at 45° to planes orthogonal to the first axis, thereby making the second axis orthogonal to the first axis and facilitating the mounting of the third support and its connection to the second motor. The second mirror is preferably at 45° to planes orthogonal to the second axis.

Preferably, at least one of the supports is in the form of a housing, e.g. box-like or tubular in shape.

BRIEF DESCRIPTION OF THE DRAWING

The invention will be described further, by way of example, with reference to the accompanying drawing, whose sole FIGURE is a sectional elevation of one embodiment of apparatus for directing a light beam.

DESCRIPTION OF THE PREFERRED EMBODIMENT

Referring to the drawing, a first support 1 is intended to be mounted on a lighting truss and carries a light source 2 directed downwardly. The light source 2 has its beam focussed by a set of lenses 3, the axis 4 of the light beam being vertical and fixed.

The first support 1 which is box-like in character supports and has protruding downwardly from it, a tubular support 5 which surrounds the vertical axis 4 of the light beam. The tubular support 5 is rotatable in relation to the fixed support 1 and is rotated by a motor 6 through a belt drive. Suitable bearings are carried by the fixed support 1. The tubular support 5 carries a plane mirror 7 through which the axis 4 passes and which is oblique to the axis 4. In the preferred embodiment the mirror 7 is at 45° to planes orthogonal to the axis 4.

A further tubular support 8 open at its bottom end has a short tubular protrusion 9 at right angles thereto, the short tubular protrusion 9 being mounted in an aperture in the wall of the tubular support 5 so as to be rotatable about an axis 10 which coincides with the reflection of the axis 4 in the mirror 7, in the preferred embodiment the axis 10 is orthogonal to the axis 4 and therefore horizontal. A motor 11 is supported by the tubular support 5 and is coupled via a belt drive to the tubular protrusion 9 for rotation of the tubular support 8 about the axis 10. The tubular support 8 carries a mirror 12 through which the axis 10 passes and which is oblique to the axis 10. In the preferred embodiment the mirror 12 is at 45° to planes orthogonal to the axis 10. The axis 13 of the tubular support coincides with the reflection of the axis 10 in the mirror 12.

It will be seen that the axes 4, 10, and 13 denote the path of the centre line of a light beam produced by the light source 2. It will be appreciated that by suitable energisation of the motors 6 and 11, it will be possible to direct the light beam in any desired direction.

I claim:

1. Apparatus for directing a beam of light in any direction, comprising a first support, a light source mounted on the first support, an optical system arranged to direct the output beam of the light source along a first axis fixed in relation to the first support, a second support mounted on the first support for rotation substantially about the first axis, a first motor for rotating the second support about the first axis, a first reflector mounted on the second support so that the first axis passes through it in all angular positions of the second support about the first axis, the first reflector being oblique to the first axis, a third support mounted on the second support for rotation substantially about a second axis which coincides with the reflection of the first axis in the first reflector, a second motor for rotating the third support about the second axis, and a second reflector mounted on the third support so that the second axis passes through it in all angular positions of the third support about the second axis, the second reflector being oblique to the second axis.

2. Apparatus as claimed in claim 1, in which the first mirror is at 45° to planes orthogonal to the first axis.

3. Apparatus as claimed in claim 1, in which the second mirror is at 45° to planes orthogonal to the second axis.

4. Apparatus as claimed in claim 1, in which the first mirror is at 45° to planes orthogonal to the first axis and the second mirror is at 45° to planes orthogonal to the second axis.

5. Apparatus as claimed in claim 1, in which the second support has a tubular portion rotatably mounted on the first support, and the first motor is carried by the first support and is kinematically connected to the said tubular portion.

6. Apparatus as claimed in claim 1, in which the third support has a tubular portion rotatably mounted on the second support, and the second motor is carried by the second support and is kinematically connected to the tubular portion of the third support.

7. Apparatus as claimed in claim 1, in which at least one of the supports is in the form of a housing.

8. Apparatus as claimed in claim 1, in which at least one of the reflectors is a mirror.

9. Apparatus as claimed in claim 8, in which the mirror is plane.

10. Apparatus as claimed in claim 1, in which the first axis is substantially vertical.

* * * * *